United States Patent
Charach

(10) Patent No.: US 8,606,226 B1
(45) Date of Patent: Dec. 10, 2013

(54) ADVERTISING SYSTEM FOR MOBILE DEVICES AND METHOD OF OPERATING THE SAME

(76) Inventor: Shimon Charach, Brooklyn, NY (US)

(*) Notice: Subject to any disclaimer, the term of this patent is extended or adjusted under 35 U.S.C. 154(b) by 0 days.

(21) Appl. No.: 13/616,183

(22) Filed: Sep. 14, 2012

(51) Int. Cl.
*H04M 11/00* (2006.01)

(52) U.S. Cl.
USPC ......... 455/406; 455/405; 455/408; 455/414.1

(58) Field of Classification Search
USPC ................... 455/405, 406.408, 414.1
See application file for complete search history.

(56) References Cited

U.S. PATENT DOCUMENTS

| | | | |
|---|---|---|---|
| 6,411,684 B1* | 6/2002 | Cohn et al. | 379/88.14 |
| 6,647,257 B2* | 11/2003 | Owensby | 455/414.1 |
| 8,073,472 B1* | 12/2011 | Thakur et al. | 455/466 |
| 2007/0244752 A1* | 10/2007 | Bayne | 705/14 |
| 2008/0119174 A1* | 5/2008 | Farkas et al. | 455/414.1 |
| 2008/0134043 A1* | 6/2008 | Georgis et al. | 715/733 |
| 2008/0235332 A1* | 9/2008 | McChesney et al. | 709/204 |
| 2008/0244666 A1* | 10/2008 | Moon et al. | 725/87 |
| 2009/0030757 A1* | 1/2009 | Admon et al. | 705/7 |
| 2009/0249384 A1* | 10/2009 | Fang et al. | 725/23 |
| 2012/0030002 A1* | 2/2012 | Bous et al. | 705/14.36 |

* cited by examiner

*Primary Examiner* — Kwasi Karikari
(74) *Attorney, Agent, or Firm* — Gottlieb, Rackman & Reisman, P.C.

(57) ABSTRACT

In a cellular telephone system, an account manager server is used to monitor all services provided to hand-held devices of the system and to charge the respective customers of the system. The server also provides advertisements to the customers via data channels for the devices. The customers are charged for services based on the number of advertisements (if any) presented on the devices. Optionally, customers may buy goods or services associated with the presented advertisements, in this case, the amount charged for voice and/or data services provided by the system are adjusted as well.

15 Claims, 4 Drawing Sheets

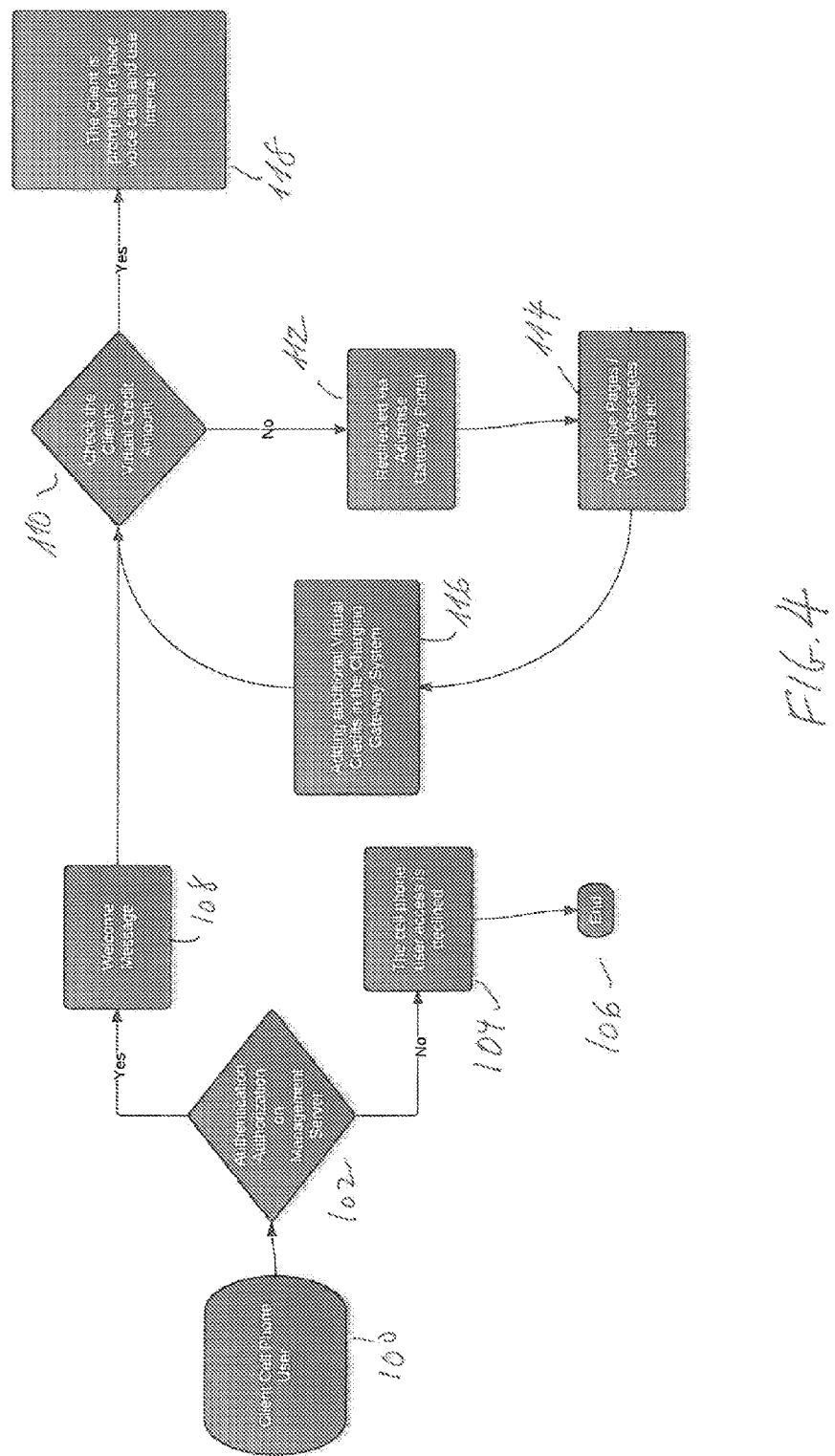

ADVERTISING SYSTEM FOR MOBILE DEVICES AND METHOD OF OPERATING THE SAME

RELATED APPLICATIONS

None

BACKGROUND OF THE INVENTION

A. Field of Invention

This application pertains to a system and method of providing advertising on hand-held and similar devices, including cell phones and the like. A user elects to receive targeted advertisement in return for rewards, such as either cheaper or free service.

B. Description of the Prior Art

Various hand-held devices have become ubiquitous in various activities, ranging from business to entertainment, shopping, travel, etc. to the point where many people could not conceive living without them. Such devices are used by individuals as primarily means of communicating with each other as well as with various service providers and other entities. More specifically, these devices are used for not only standard voice communications (e.g., mobile telephone calls), but also to obtain and exchange content via emails and texts, as well as web sites, chat rooms and social media such as Facebook and other similar services.

Of course, while individuals pay for accessing these services to their respective service providers, they have gotten used and expect to gain access to the content for free. Therefore, many content providers have resorted to presenting some advertisements together with the contents as a means of obtaining revenue for their services. The advertisements are provided by third parties. However, in most situations, individuals have learned to ignore most advertisements, and accordingly, advertisers are looking for techniques for encouraging individuals using hand-held devices to pay more attention to their advertisements. The present invention provides such a technique.

SUMMARY OF THE INVENTION

A system constructed in accordance with this invention includes a base station providing cellular telephone service and data to a device associated with a customer and an account manager server associated with the base station and monitoring all services provided with the device. The account manager includes a feed selector that is operated by a controller to selectively provide to the device either standard Internet service or an advertisement to be presented to the customer. The advertisement can be a generic advertisement, can be an advertisement selected by the customer or can be selected based on a profile for the customer.

The account manager server generates a bill for the customer or a prepaid scheme may be used. Either way, the amount charged to the customer for services provided by the system is dependent on the number of advertisements presented to the customer. Every time the customer watches an advertisement, a credit balance is accumulated and this credit balance may be used in determining the amount charged to the customer for services.

Optionally, the customer may elect to purchase some other goods or services associated with a presented advertisement. Such a purchase is also used to adjust the credit balance of the consumer.

BRIEF DESCRIPTION OF THE DRAWINGS

FIG. 4 shows a flow chart illustrating how the customer accesses services using the system of FIGS. 1-3. shows a general flow chart for operating the system.

DETAILED DESCRIPTION OF THE INVENTION

In the following description, the term 'hand-held device' refers to various devices that can provide electronic communications and content to the respective user via either a cell phone system, Internet, or both. Such devices include such devices as smart phones, tablets, laptops, etc. For the purpose of illustrating the invention, the system is now described in conjunction with a smart phone, however, it should be understood that the description is equally applicable for any of the other hand-held devices as well.

Figure 1:
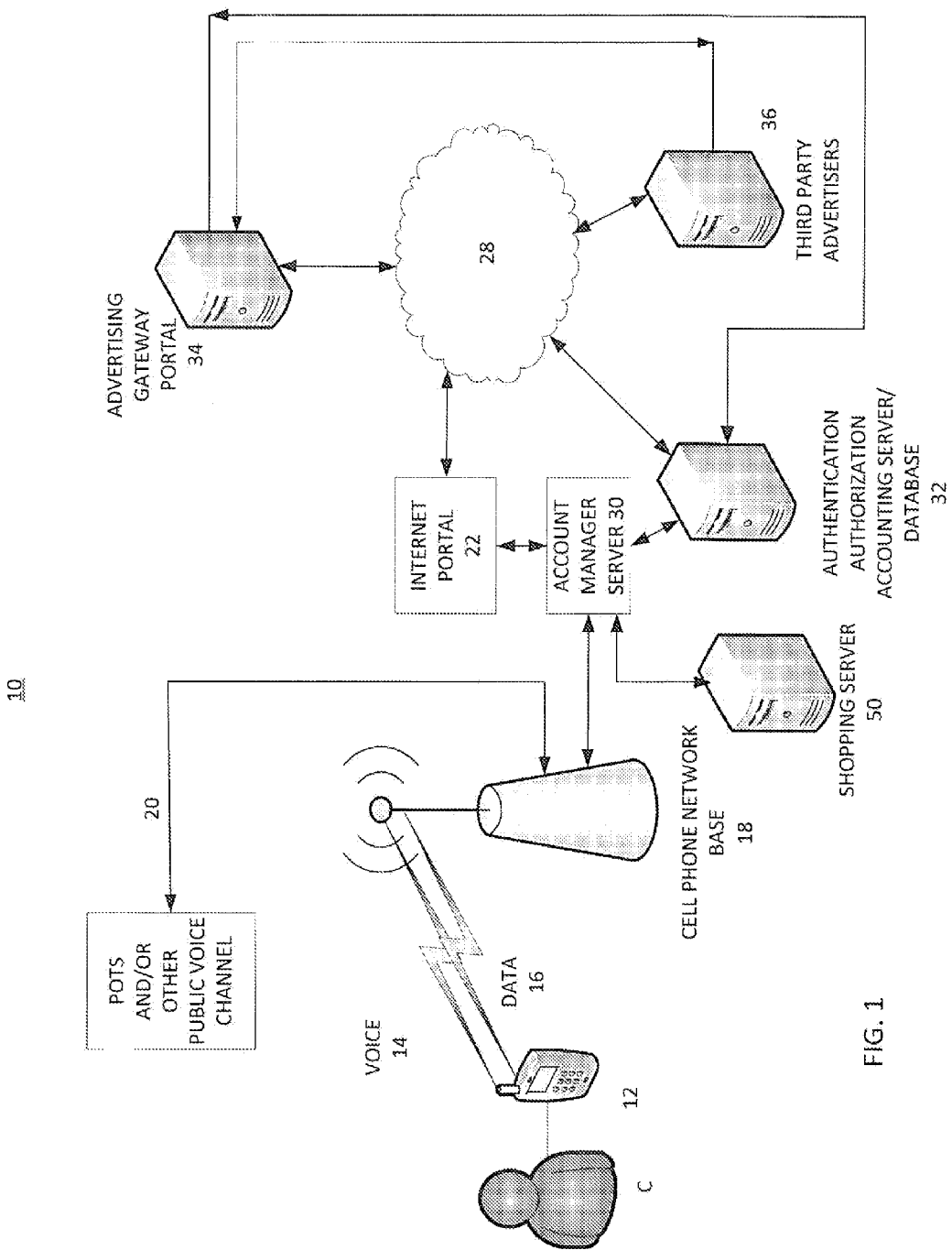
FIG. 1 shows a block diagram of a system constructed in accordance with the present invention.

Referring first to FIG. 1, in system 10 a customer C is using a portable device, such as a smart phone 12 for both voice communications and data communications to obtain content. Device 12 is connected by a voice channel 14 and a data channel 16 with a base station 18. The voice channel 14 provides standard telephone communications for the smart phone 12 while data channel provides an Internet connection (as well as other information) as described in more details below.

The base 18 is connected by a communication line 20 (usually a land-line) to a POTS or other standard public telephone service 22. All standard telephone (e.g., voice) communications for the smart phone 12 are provided through line 20 and the service 22.

An account manager server 30 monitors all the services provided by the base 18 to its devices a described in more details below. The server 30 is also in communication with a server/database 32 used for storing various authorization, authentication and accounting data.

The account manager is in communication with an Internet portal 24. The Internet portal 24 is connected to the Internet 28 and provides data communications for smart phone 12 (and, of course, other hand-held devices in the area covered by the base 18) as described more fully below. In some instances, a hand-held device (not shown) may not be configured for receiving advertisements and the base 18 may be connected to the portal 24 directly. Alternatively, the account manager server 30 is configured to monitor data usage and voice communications provided for the hand-held device and charge its user in a conventional manner, i.e., without providing any advertisements. In conventional systems, the costs for the communication and data services for the device 12 were monitored and charged to customer C on a monthly basis and/or on demand, based on usage. For example, a typical customer C may be charged a set monthly fee for X number of telephone calls and Y MBs of data and additional fees are charged for extra calls or data.

In the present system, at least some, if not all these costs are offset by presenting at least some of the customers with advertisements. The advertisements are provided on demand by an advertisement gateway portal 34. Alternatively, the advertisements may be obtained at a previous time and stored in the database 32 or other data storage means. The advertisements are provided to the portal 34 by third party advertisers 36 either directly or via the Internet. Each time and advertisement is presented to customer C, database 32 is notified so that a proper accounting may be made to portal 34 or advertisers 36.

In one embodiment, the customer C is also provided with the choice of buying goods or services associated with an advertisement that was just presented to him (e.g., during the advertisement, the customer is presented with a choice of buying the goods or services either during or immediately after the presentation). When the customer selects this choice, the account manager server 30 connects to a shopping server 50 which then manages transactions between the customer C and the respective goods or services. Of course, the customer may be provided with some credit each time he buys something associated with a current advertisement.

In one embodiment of the invention, a rate is established which determines how much (and in some instances, what type of) credit is provided to a customer depending, for example, on the actual advertisements presented, the length of each advertisements, whether the customer has made a purchase of goods and services based on the advertisements, etc.

Figure 2:
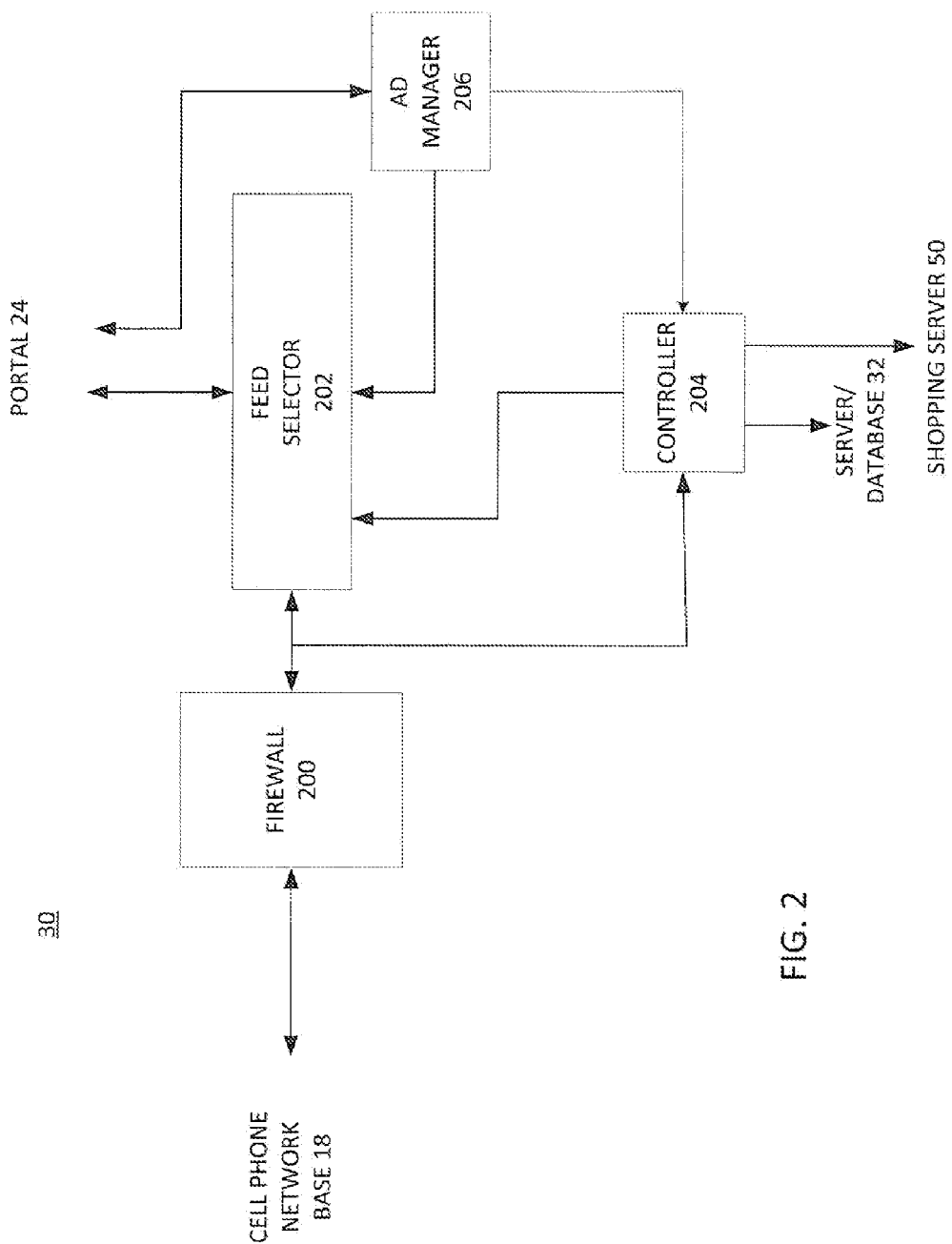
FIG. 2 shows details of the account manager server used in the system.

FIG. 2 shows details of the account manager server 30. The server 30 includes a firewall 200 through which all data communications take place with the base 18. The server 30 further includes feed selector 202 and a controller 204. The controller 204 monitors and controls the communications to and from the base 18. The controller 204 also communicates with the server/database 32 and (if present) shopping server 50. In one embodiment, servers 32 and 50 may be incorporated into server 30 however they are shown here as separate elements for the sake of clarity. The controller 24 the feed selector 202 and ad manager 206. The controller 204 performs all the accounting necessary to service the accounts of all the customers associated with the system.

The feed selector can exchange data with the Internet portal 24. The ad manager is connected to the advertising gateway portal 34 either directly, or through the Internet (e.g., portal 24) as described in more detail below.

Figure 3:
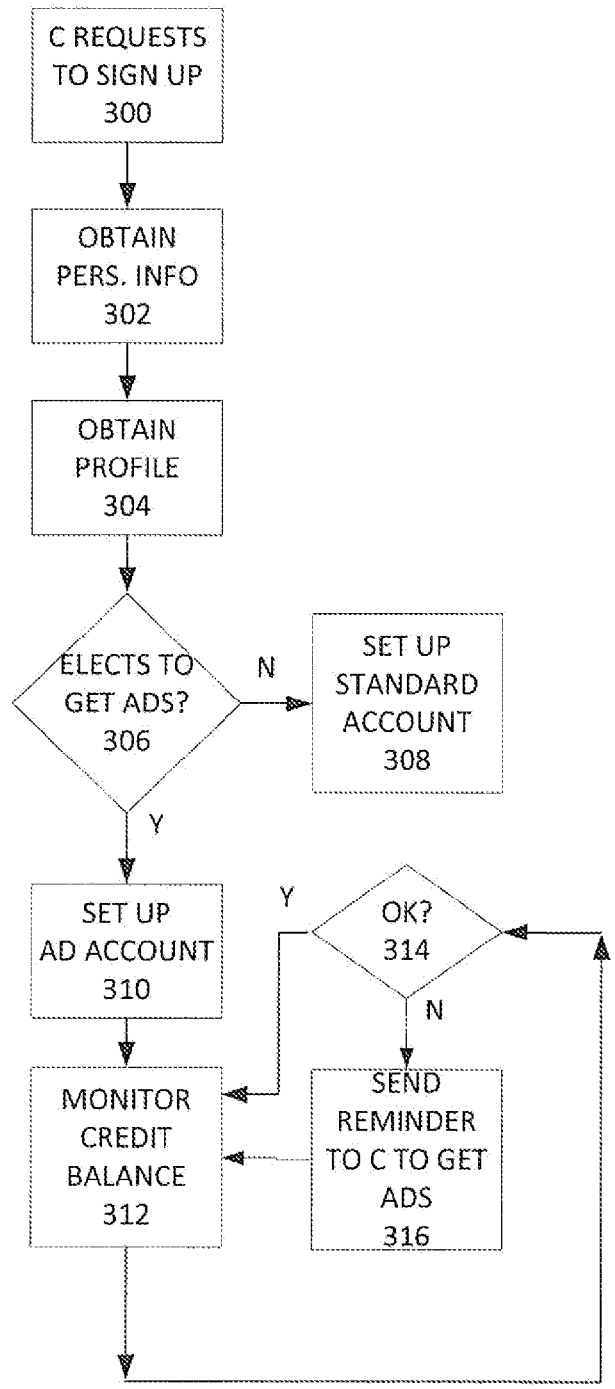
FIG. 3 shows a flow chart for setting up an account and monitoring the account for the customer in the system of FIGS. 1 and 2.

The operation of the system 10 is now described in conjunction with the flow charts of FIGS. 3 and 4.

FIG. 3 shows an exemplary process for signing a customer up to the present system. This process may be performed by the controller 204 or another similar processor and can be performed automatically via the Internet 28 or through a live operator. In step 300 the customer C indicates that he wants to sign up to the service. In step 302 personal information about the customer is obtained, including his name, address, email address (unless provided by the system), charge card information, etc. In step 304 information is obtained about the customer C. For example, the customer may also provide information from which a profile is developed for the customer, including his likes, dislikes, hobbies, etc, so that the customer can be targeted with the proper advertisement. All this information is stored in database 32 or other database. Optionally, the profile associated with the customer may be generated or enhanced using information derived progressively as the customer is using the system. For example, the ads selected or goods or services purchased by the customer C may be used to generate or update the profile.

In step 306 the customer is given the choice of getting ads in return for credits or not. If he does not want ads, then a standard account is set up in step 308. If the customer elects to get ads then in step 310 one or more appropriate accounts are set up for the customer C.

After the account(s) are set up, the processor controls the communications and services for the customer and collects the data necessary for billing purposes.

In addition, the controller 204 also monitors C's credit account related to the advertisings presented to and purchases made by C (step 312). If the credit account does not meet certain predetermined criteria (for example, it is below a certain threshold) as determined in step 314 then in step 316 a message is sent by conventional means to remind the customer that, in accordance with the terms of service, he is required to accept at some ads until his credit account is acceptable. This routine is performed on a routine basis, e.g., every couple of days, every week, etc.

If the customer's credit balance is below the threshold for an extended period of time, the customer C may be shifted to a different plan in which he has to pay more for the system services (e.g. access to voice services and/or Internet).

Referring to FIG. 4, during normal operation of the system, the customer C first initiates an action on his smart phone 12 in step 100 indicating that he would like to either access the Internet to obtain content or wants to access a voice channel. The smart phone 12 issues an appropriate request on the data channel 16 to the base station 18.

In step 102, he account manager server 30 contacts the server/database 32 and checks whether the customer C is a legitimate customer and whether is authorized to get services.

If the customer C is not recognized as a legitimate user or not entitled to a requested service, then his request is denied (step 104) and the process ends (step 106).

If the customer C is recognized and is entitled to service, then in step 108 the server 30 sends a welcome message to the customer C. The message is transmitted preferably over the data channel 16 and can be a text, message, an image, an oral message, etc.

As previously mentioned, a customer may choose any one of several plans. In some instances, the customer may decide on a low cost service, in which case he may be allowed no calls or no data without participating in an advertisement campaign. Other customers may elect a high cost service which requires little or no participation. Assuming for the purpose of this discussion that the customer has selected a service plan that requires some participation, then each time a customer participates, he is granted some credit. The actual amount of this credit is set by the service provider based on negotiations with the advertisers 36 and other factors.

In any event, in accordance with this invention, each customer C is assigned a credit balance based on his participation which is checked at regular intervals by processor 204 as described above, and in the flow chart of FIG. 3. In step 110 this credit balance is checked and, optionally, the customer C is provided this credit balance so he knows where he stands. The credit balance is stored preferably in the authorization authentication server database 32. Optionally, the customer C can contact the server 30 and obtain his credit balance at any time.

If this credit balance is above a predetermined threshold, the customer does not need to participate in and advertisement campaign. If he selects not to participate, he is provided with a voice channel or Internet access in step 118, depending on what service the customer wants. The voice channel is provided by the base station in the normal manner. Internet service is provided by setting the feed selector 202 (FIG. 2) so that it provides data exchange directly through the Internet portal 24.

If the credit balance is below the threshold, maybe warned that he has not received ads sufficient to put his credit balance above the threshold. He is then provided with either a voice channel or access to the Internet in step 118 as described above.

Whether the customer has enough credits or not, in step 110 he is also given the opportunity to participate. This option allows the customer to build up his credit.

If the customer C does elect to participate, in step 112, the feed selector 202 is switched so that it now provides communication with the ad manager 206. Next, a web page is presented to the customer (or some other message is sent) indicating that he will now be presented with one or more ads. Optionally, the customer may be given a choice of selecting what type of ads he wants to be presented with, and/or in what format. Next, the ad manager 206 contacts the portal 304 and obtains an advertisement for the customer. This advertisement may be a generic advertisement or may be targeted for customer C based on his profile. The advertisement is then sent either directly from the portal 34 to the ad manager 206 or through the Internet 18. The advertisement is then sent via the feed selector 202, firewall 200, data channel 16 to smart phone 12 for presentation to the customer C (step 114). As is conventional, the smart phone 12 includes at least one speaker, a screen and several actual and/or virtual keys. The keys are used by the customer C to make the various selections, and/or provide various data as described. The advertisement can be an audio visual presentation on the screen and the speaker, a sound-only presentation, a text presentation on the screen, etc.

As previously discussed, in one embodiment, the customer may buy goods or services related to a particular advertisement. This purchase is managed by the shopping server 50 cooperating if necessary with an application installed on the device 12.

Returning back to FIG. 4, once an advertisement is presented to the customer, his credit balance is increased by with an appropriate amount in step 116. As discussed above, the credit balance may be increased by a different amount if the customer also purchases a product or service as part of participating in the advertisement campaign.

Next, back in step 110 the customer is give the choice of receiving another advertisement or continue on and get provided either a voice channel 14 so that he can call some other parties, or is given access to Internet 18 through the portal 24.

Obvious, numerous modifications may be made without departing from the scope of the invention as set forth above.

I claim:

1. A system for providing wireless communication to a device associated with a customer comprising:
 a base station in wireless communication with the device on a data channel; and
 a manager server connected to said base station and receiving selectively ads from an advertisement source and a service request for service from the device, said service including providing at least one of establishing a voice communication between the device associated with the customer and other devices and data access to a distributed computer network;
 said manager server being adapted to present advertisements to said device and to generate an ad credit to the customer based on the ads presented to the customer on the device;
 said manager being further adapted to (1) sense said service request for service, (2) in response to said service request, determine if the customer has sufficient ad credit, (3) based on said determination, if the customer has insufficient ad credits, sending to the device a message to the customer indicating said determination; and (4) deny service to the customer if the customer has insufficient ad credits.

2. The system of claim 1 wherein said base station and said manager server cooperate to provide selectively Internet service on said device.

3. The system of claim 2 wherein said base station and said manager includes a feed selector selectively providing one of an Internet connection to said device for general Internet activities and a direct connection from the device to an advertisement portal, said advertisement portal providing selectively ads to the device over the Internet.

4. The system of claim 3 wherein said manager server is further adapted to receive an ad request from said hand-held device in response to ad said message, said manager server enabling said feed selector to connect to said advertisement portal and feed advertisements to said device.

5. The system of claim 1 wherein said base station is adapted to establish a voice channel with the device and to provide cellular communication over said voice channel for the device.

6. The system of claim 1 further comprising a shopping server receiving requests for goods or services from the device.

7. The system of claim 6 wherein said manager server is further adapted to assign more ad credit when a purchase is made on the shopping server by the device in association with said advertisement being presented on the device.

8. The system of claim 1 wherein said manager server is further adapted to receive an ad request from the device.

9. An account manager server associated with a mobile base communicating with a hand-held device, said manager comprising:
 a controller monitoring services provided to said hand-held device and adapted to receive a service request for a service from the device through said base; and
 a feed selector operated by said controller to selectively provide to the device one of a standard Internet service and an advertisement portal adapted to present advertisements to the feed selector for said hand-held device through the internet;
 wherein said controller is further adapted to assign ad credit to a customer associated with said hand held device based on advertisements presented on the hand-held device from said advertisement portal;
 wherein said controller is further adapted to (1) sense said service request, in response to said service request (2) determine the ad credit accumulated for the customer, and (3) if said ad credit is insufficient deny service in response to said service request.

10. The account manager server of claim 9 wherein said controller is adapted to generate a bill for said services, and a credit balance associated with said device, wherein said bill is adjusted in accordance with said credit balance by said controller, said credit balance being dependent on how many advertisements have been presented to on the hand-held device.

11. The account manager server of claim 9 wherein said service includes voice channel communications for the device.

12. The account manager server of claim 9 wherein said controller is further adapted to receive a profile for the customer, wherein advertisements from said advertisement portal for the device are selected based on said profile.

13. The account manager server of claim 9 wherein said controller is further adapted to communicate with a shopping server, the shopping server providing goods or services to the customer in response to a shopping request from the customer, wherein said controller is adapted to adjust said bill when said shopping server provides said goods or services in association with said advertisement.

14. The account manager of claim 9 wherein said controller is further adapted to monitor said ad credit and is adapted to generate balance message to said hand held device at regular time intervals.

15. The account manager of claim 14 wherein said controller generates said message when said credit balance meets certain predetermined criteria.

* * * * *